(No Model.)

J. T. SPICKLEMIRE.
GRAIN DRILL.

No. 441,713. Patented Dec. 2, 1890.

Witnesses
F. L. Ourand
Wm. Bagger

Inventor
J. T. Spicklemire,
By his Attorneys
C. A. Snow & Co.

United States Patent Office.

JAMES THOMAS SPICKLEMIRE, OF AVON, INDIANA.

GRAIN-DRILL.

SPECIFICATION forming part of Letters Patent No. 441,713, dated December 2, 1890.

Application filed May 12, 1890. Serial No. 351,475. (No model.)

*To all whom it may concern:*

Be it known that I, JAMES THOMAS SPICKLEMIRE, a citizen of the United States, residing at Avon, in the county of Hendricks and State of Indiana, have invented a new and useful Grain-Drill, of which the following is a specification.

This invention relates to grain-drills; and it has for its object to provide a grain-drill, instead of the usual hoes, with runners similar to those of a corn-planter.

A further object is to keep these runners clear and free from weeds and trash in advance of the dropping mechanism.

A further object of the invention is to provide springs for forcing the runners with their attachments automatically in a downward direction, so as to hold them in contact with the ground, while at the same time enabling them to ride freely over any obstacles that may be encountered.

With these ends in view the invention consists in the improved construction, arrangement, and combination of parts, which will be hereinafter fully described, and particularly pointed out in the claim.

Figure 1:
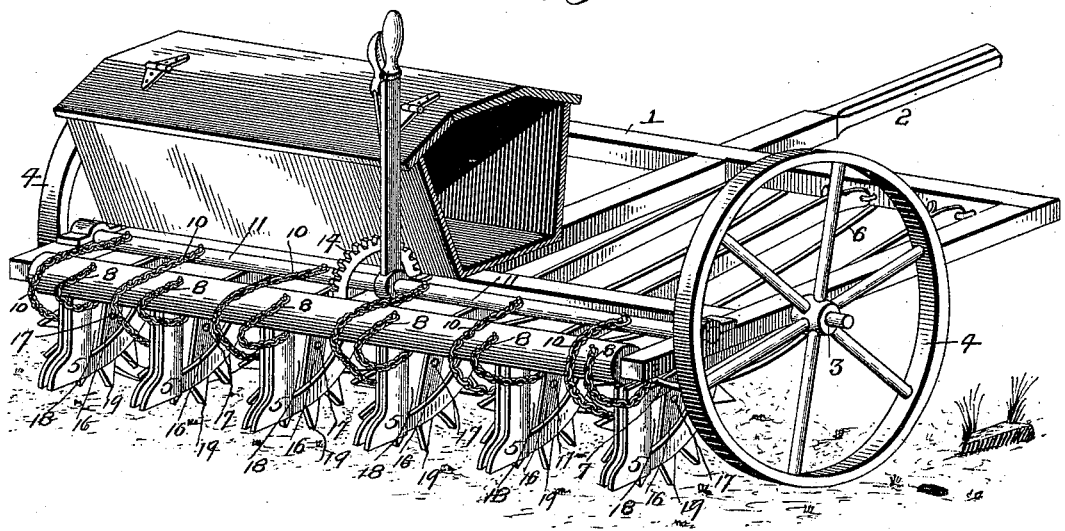
Figure 2:
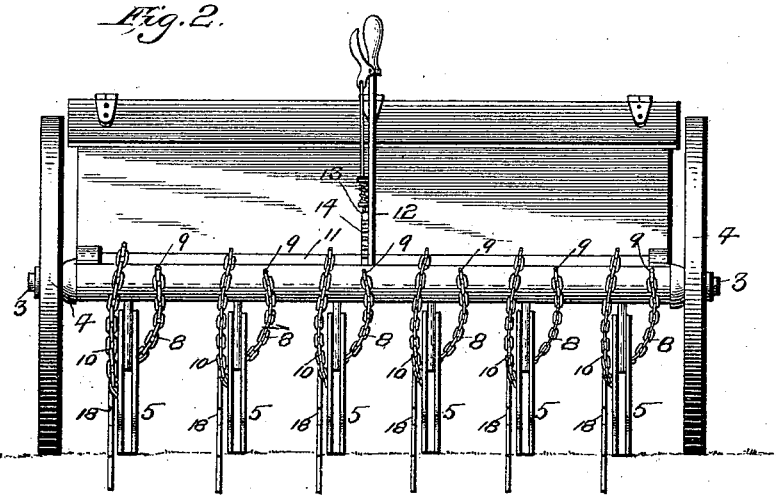
Figure 3:
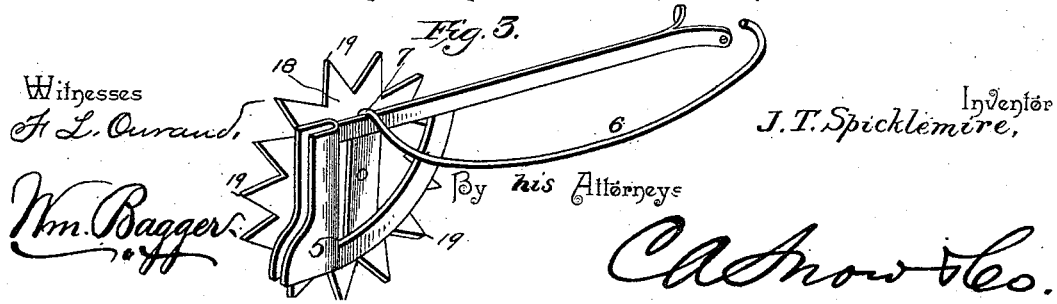

In the drawings, Figure 1 is a perspective view of a grain-drill frame equipped with my attachments. Fig. 2 is a rear elevation of the same. Fig. 3 is a perspective view on a larger scale of one of the runners with clearing attachment.

Like numerals of reference indicate like parts in all the figures.

The frame of the grain-drill, which is designated by 1, may be constructed in any suitable manner. In the drawings hereto annexed it has been shown as consisting simply of a rectangular frame, centrally to which is secured the forwardly-extending tongue 2. The side beams of the frame are provided with stub axles 3, upon which the wheels 4 are mounted.

The runners, which are designated by 5, are hinged to the front beam of the frame 1, from which they extend rearwardly, as shown. The runners are in all essential particulars of ordinary construction, and no special novelty is claimed either for said runners or for the seed-dropping mechanism, which latter, being no part of my invention, has not been shown in the drawings. Springs 6, which may be attached either to the front or to the rear cross-beam of the frame 1, are provided at their free ends with hooks 7, which straddle the upper sides of the runners, thus serving to force the said runners in a downward direction and into contact with the ground. Chains 8, which are attached to the rear ends of the runners, are adjustably mounted upon pins 9, that extend rearwardly from the rear cross-beam of the frame. These chains serve to limit the extent to which the runners shall be permitted to enter the ground. Additional chains 10 are likewise secured to the rear ends of the runners. These chains are for the purpose of raising or elevating the runners from the ground, when desired, in transporting the machine from one field to another or over the roads, and suitable mechanism, such as a rock-shaft having rearward-extending radial arms, to which the ends of the chain 10 are attached, may be provided for the purpose of enabling the several runners to be simultaneously raised from the ground. In the drawings hereto annexed such a rock-shaft designated by 11 has been shown mounted in suitable bearings upon the side beams of the frame, said rock-shaft being provided with an operating-lever 12, having a spring-catch 13, engaging a segmental rack 14, for the purpose of retaining it at any desired adjustment. Said rock-shaft is furthermore provided with rearward-extending arms to which the upper ends of the chains are attached. The operation of this device is obvious. Each of the runners 5 is provided on one side with a brace 16, which, together with the body of the runner, affords bearings for a short transverse shaft 17, carrying a peripherally-toothed or star-shaped wheel 18, which constitutes the clearing device. The points of the teeth 19 of the wheel 18 project slightly below the shoe of the runner, so as to engage the ground when the machine is in operation.

The operation of my invention and its advantages will be readily understood from the foregoing description, taken in connection with the drawings hereto annexed. When the machine is in operation and the runners are in contact with the ground, the clearing-wheels will engage the surface of the ground and be rotated as the machine progresses over the field, thereby causing weeds and rubbish to be swept away instead of accumulating in advance of the runners, thereby choking the machine. The depth to which the runners shall be permitted to enter the soil may be gaged by the adjusting-chains 8, and when the machine is to be transported from one field to another the said runners may be raised from contact with the ground by means of the chains 10 and the mechanism whereby said chains are operated.

The general construction of my machine is simple and inexpensive, and my improvements may be readily applied to any grain-drill of ordinary construction.

Having thus described my invention, I claim—

The combination of the drill-frame, the runners hinged to the front beam thereof, the toothed or star-shaped wheels journaled to the sides of the runners, springs to force the runners in a downward direction, chains attached to the rear ends of the runners and mounted adjustably upon pins extending from the rear cross-bar of the frame to limit the movement of the runners in a downward direction, and hoisting-chains connecting the rear ends of the runners with arms extending rearwardly from the rock-shaft provided with an operating-lever, whereby the runners may be simultaneously raised from the ground, all combined and operating substantially as and for the purpose herein set forth.

In testimony that I claim the foregoing as my own I have hereto affixed my signature in presence of two witnesses.

JAMES THOMAS SPICKLEMIRE.

Witnesses:
I. B. McCLAIN,
JOHN V. HADLEY.